(12) United States Patent
Nos et al.

(10) Patent No.: US 8,739,166 B2
(45) Date of Patent: May 27, 2014

(54) PROGRESS-DRIVEN PROGRESS INFORMATION IN A SERVICE-ORIENTED ARCHITECTURE

(75) Inventors: Karl-Peter Nos, Nussloch (DE); Frank Brunswig, Heidelberg (DE); Matthias Richter, Sinsheim (DE); Thomas Gauweiler, Speyer (DE); Holger Rose, Bad Schoenborn (DE)

(73) Assignee: SAP AG, Walldorf (DE)

( * ) Notice: Subject to any disclaimer, the term of this patent is extended or adjusted under 35 U.S.C. 154(b) by 639 days.

(21) Appl. No.: 12/647,815

(22) Filed: Dec. 28, 2009

(65) Prior Publication Data

US 2011/0161960 A1    Jun. 30, 2011

(51) Int. Cl.
*G06F 9/46* (2006.01)

(52) U.S. Cl.
USPC .......................................................... 718/102

(58) Field of Classification Search
None
See application file for complete search history.

(56) References Cited

U.S. PATENT DOCUMENTS

| | | | |
|---|---|---|---|
| 6,336,135 B1 | 1/2002 | Niblett et al. | |
| 6,615,231 B1 | 9/2003 | Deen et al. | |
| 6,654,726 B1 | 11/2003 | Hanzek | |
| 6,757,706 B1 | 6/2004 | Dong et al. | |
| 6,937,993 B1 | 8/2005 | Gabbita et al. | |
| 6,938,251 B1 | 8/2005 | Chow et al. | |
| 7,853,959 B2 | 12/2010 | Agassi et al. | |
| 2002/0078212 A1* | 6/2002 | Besaw et al. | 709/228 |
| 2003/0037009 A1 | 2/2003 | Tobin et al. | |
| 2004/0168587 A1 | 9/2004 | Esaki et al. | |
| 2005/0044224 A1* | 2/2005 | Jun et al. | 709/225 |
| 2006/0143290 A1 | 6/2006 | Dostert et al. | |
| 2007/0208587 A1 | 9/2007 | Sitaraman | |
| 2008/0015996 A1 | 1/2008 | Notani | |
| 2009/0164933 A1 | 6/2009 | Pederson et al. | |
| 2009/0171893 A1* | 7/2009 | Gonzales et al. | 707/3 |
| 2009/0296725 A1* | 12/2009 | Imanaka | 370/401 |

OTHER PUBLICATIONS

"Complying with XML and NETCONF Conventions", Juniper Networks, Inc., Feb. 13, 2006, retrieved date May 15, 2012, retrieved from 7pgs.
"IT Hit WebDAV for NET", IResumableUpload Interface, retrieved date May 14, 2012, retrieved from 7pgs.
"Non-Final Office Action" mailed Nov. 23, 2011, for U.S. Appl. No. 12/647,732, entitled "Progress Information in A Service-Oriented Architecture", filed Dec. 28, 2009, 26pgs.
"Final Office Action" mailed May 22, 2012, for U.S. Appl. No. 12/647,732, entitled "Progress Information in A Service-Oriented Architecture", filed Dec. 28, 2009, 27pgs.
Frank Brunswig et al., "Non-Final Office Action" mailed Apr. 12, 2013, for U.S. Appl. No. 12/647,732, entitled "Progress Information in a Service-Oriented Architecture", filed Dec. 28, 2009, 24pgs.

* cited by examiner

*Primary Examiner* — Mengyao Zhe
(74) *Attorney, Agent, or Firm* — Buckley, Maschoff & Talwalkar LLC

(57) ABSTRACT

A system may include reception of the first instruction, execution of the business process in a first software work process, reception, during execution of the business process, of an indication of a business object process associated with the business process, determination of progress information associated with the business process based on the indication of the business object process, and storage of the progress information within a memory. Aspects may further include reception, at a second work process, of a request from the client application for progress information, retrieval of the progress information from the shared memory and provision of the progress information to the client application.

18 Claims, 10 Drawing Sheets

← 400

SAP Business
ByDesign
　　　　　　　　　　　　　　　　　　　　　　Advanced　Logout

New Employee Information

Name　| John Doe |

Department　| Sales |　　Division　| Hardware |

| Hire Date | Contract (Y/N) | Full-time (Y/N) | Salary | Home Address | Citizenship |
|-----------|----------------|-----------------|--------|--------------|-------------|
| 7/14/08   | N              | Y               | 50,000 | 123 Main     | German      |

| Hire Employee |　　| Cancel |

| PROCESS_ID | PROCESS_DESCRIPTION |
|---|---|
| HCM_A_01 | Core Hire Approve |
| HCM_A_02 | Create Position Assignment |
| HCM_A_03 | Creation of Identity |
| HCM_A_04 | Creation of Time Agreement |
| HCM_A_05 | Creation of Compensation Agreement |
| HCM_A_06 | Creation of Expense Arrangement |
| HCM_C_01 | Hiring an Employee |
| HCM_C_02 | Terminating an Employee |

| PROCESS_ID | SUBPROCESS_ID | SUBPROCESS_DESCRIPTION |
|---|---|---|
| HCM_A_01 | 5 | Checking Data Consistency |
| HCM_A_01 | 10 | Creating Employee |
| HCM_A_01 | 15 | Creating Employment |
| HCM_A_01 | 20 | Creating Work Agreement |
| HCM_A_02 | 5 | Updating Position Assignment |
| HCM_A_03 | 5 | Updating Identity |
| HCM_A_04 | 5 | Updating Time Agreement |
| HCM_A_04 | 10 | Creating Task |
| HCM_A_05 | 5 | Updating Compensation Agreement |
| HCM_A_05 | 10 | Creating Task |
| HCM_A_06 | 5 | Updating Expense Arrangement |
| HCM_C_01 | 5 | Checking Data Consistency |
| HCM_C_01 | 10 | Creating Employee |
| HCM_C_01 | 15 | Creating Employment |
| HCM_C_01 | 20 | Creating Work Agreement |
| HCM_C_01 | 25 | Creating Identity and User |
| HCM_C_01 | 30 | Assigning Employee to Organizational Structure |
| HCM_C_01 | 35 | Creating Time Agreement |
| HCM_C_01 | 40 | Creating Task to Complete Time Hire |
| HCM_C_01 | 45 | Creating Compensation Agreement |
| HCM_C_01 | 50 | Creating Task to Complete Compensation Hire |
| HCM_C_01 | 55 | Creating Expense Arrangement |
| HCM_C_01 | 60 | Saving Employee |
| HCM_C_01 | 65 | Saving Employment |
| HCM_C_01 | 70 | Saving Work Agreement |
| HCM_C_01 | 75 | Saving Time Agreement |
| HCM_C_01 | 80 | Updating Expense Arrangement |
| HCM_C_01 | 85 | Saving Expense Arrangement |

*FIG. 6*

PROGRESS-DRIVEN PROGRESS INFORMATION IN A SERVICE-ORIENTED ARCHITECTURE

CROSS REFERENCE TO RELATED APPLICATIONS

This application is related to U.S. patent application Ser. No. 12/647,732 filed on even date herewith and entitled "Progress Information in a Service-Oriented Architecture."

FIELD

Some embodiments relate to a service-oriented architecture to provide software services. More specifically, some embodiments relate to the provision of progress information to a service client during service fulfillment.

BACKGROUND

FIG. 1 is a block diagram of prior art system 100. System 100 includes client 110 and service-oriented architecture 120. Client 110 may comprise a Web browser to access services provided by service-oriented architecture 120 via HyperText Transport Protocol (HTTP) communication.

In one operational example, a user may manipulate a user interface of client 110 to input an instruction (e.g., update inventory). Client 110, in response, may transmit a corresponding HTTP service request to service-oriented architecture 120 as illustrated. Service-oriented architecture 120 conducts any processing required by the request (e.g., updating a list of inventory) and, after completing the processing, provides a response to client 110.

Client 110 does not receive any indication from service-oriented architecture 120 during the above-mentioned processing. Accordingly, after inputting the instruction and before receiving the response, the user is left to wonder whether any processing is occurring as a result of the instruction, whether service-oriented architecture 120 is non-responsive, or whether a network error has occurred between client 110 and service-oriented architecture 120. Service requests which require lengthy processing exacerbate this dilemma.

Due to the request/response nature of HTTP, the foregoing cannot be addressed simply by programming service-oriented architecture 120 to send some sort of progress indicator to client 110. In non-HTTP systems, the server system may be hardcoded to provide progress information on a case-by-case basis, or to provide all generated feedback information to the client. The former approach is inefficient and resource-intensive, while the latter approach overwhelms the client with cryptic information which, even if understood, may provide little indication of the progress of the overall business process being executed.

Accordingly, what is needed is a system to provide meaningful progress information to a client of a service-oriented architecture.

BRIEF DESCRIPTION OF THE DRAWINGS

FIG. 4 is a tabular representation of a portion of a process table according to some embodiments.

FIG. 5 is a tabular representation of a portion of a subprocess table according to some embodiments.
FIG. 6 is a flow diagram of a process according to some embodiments.

DETAILED DESCRIPTION

Figure 1:
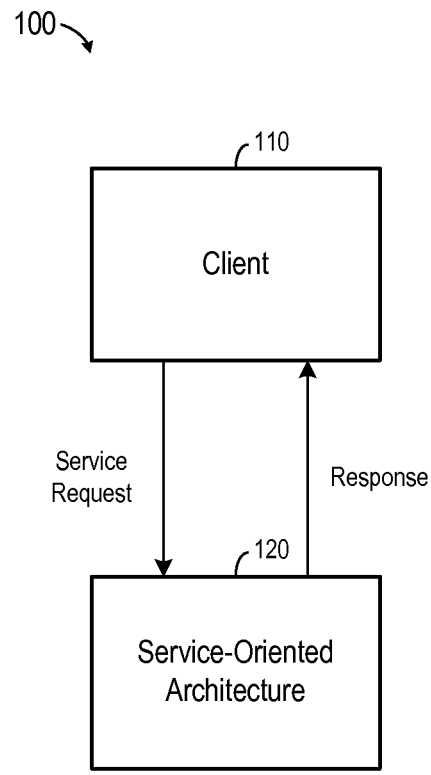
FIG. 1 is a block diagram of a prior art system.
Figure 2:
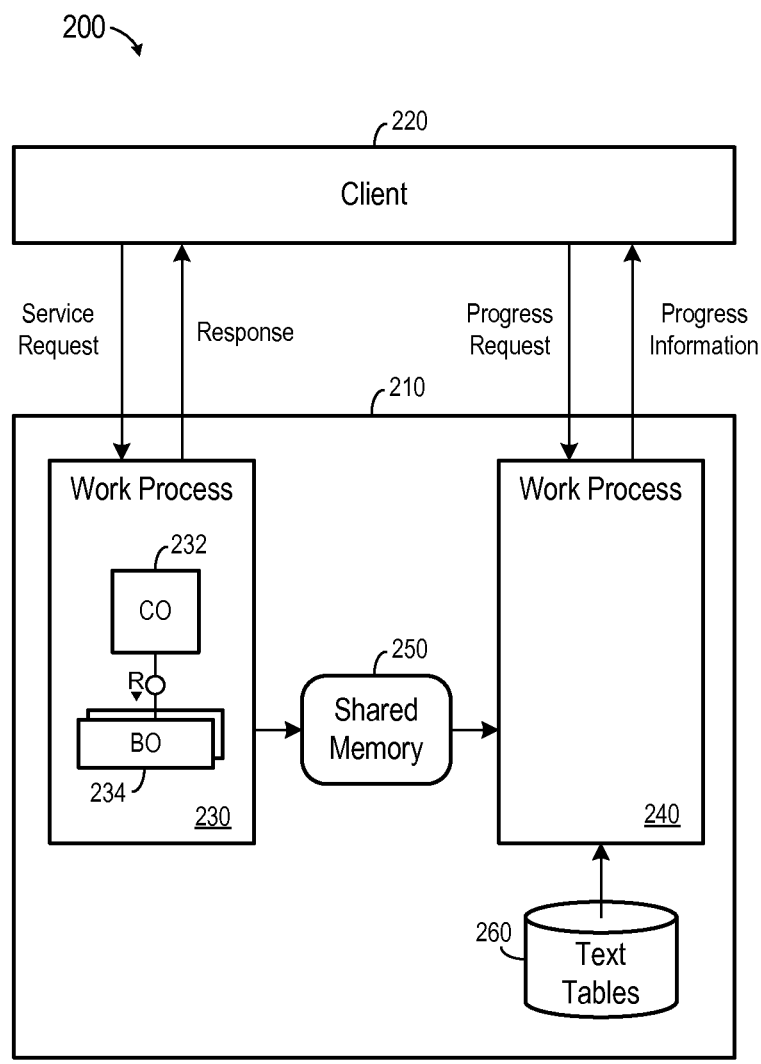
FIG. 2 is a block diagram of a system according to some embodiments.

FIG. 2 is a block diagram of system 200 according to some embodiments. System 200 includes business process platform 210 and client 220. Business process platform 210 may comprise a service-oriented architecture (e.g., SAP Business ByDesign®, Salesforce). In this regard, FIG. 2 represents a logical architecture for describing processes according to some embodiments, and actual implementations may include more or different components arranged in other manners.

Generally, business process platform 210 may provide services to client 220 according to some embodiments. Such services may comprise Web services and client 220 may therefore comprise a Web client. Examples of a Web client include, but are not limited to, a Web browser, an execution engine (e.g., JAVA, Flash, Silverlight) to execute associated code in a Web browser, and a dedicated standalone application.

Business process platform 210 includes software work process 230 and software work process 240. Each of software work processes 230 and 240 may independently execute tasks required of business process platform 210. Business process platform 210 may support more than two simultaneous software work processes according to some embodiments.

Software work process 230 includes Controller Object (CO) 232 and business objects (BOs) 234. CO 232 may be associated with a UI floorplan which is currently presented by client 220. CO 232 therefore is familiar with business processes associated with the UI floorplan. Elements of software work process 230 may execute such a business process by manipulating one or more of BOs 234, each of which is unaware of the overall business process for which it is being manipulated.

Business process platform 210 also includes shared memory 250 and text tables 260, each of which may be implemented in one of Random Access Memory, persistent storage (e.g., hard disks) and/or in any other suitable electronic memory. Shared memory 250 may store business process progress information generated by work process 230 as described below. In some embodiments, shared memory 250 stores text describing processes and subprocesses of one or more BOs 234, as well as text describing processes and sub-processes of business processes which are associated with CO 232. The text descriptions may be associated with respective identifiers to allow lookup thereof by either of work processes 230 and 240.

Text tables 260 may store descriptions of business process and business subprocesses in several languages. As will be described in detail below, work process 240 may request a description of a business process (or subprocess) in a particular language from text tables 260. The description may be forwarded to client 220.

Each of software work processes 230 and 240 is in (i.e., capable of) communication with shared memory 250, and software work process 240 is in (i.e., capable of) communication with text tables 260, but embodiments are not limited thereto. In some embodiments, both shared memory 250 and text tables 260 are implemented in a same electronic memory, which is accessible by any work process executing within platform 210.

Figure 3:
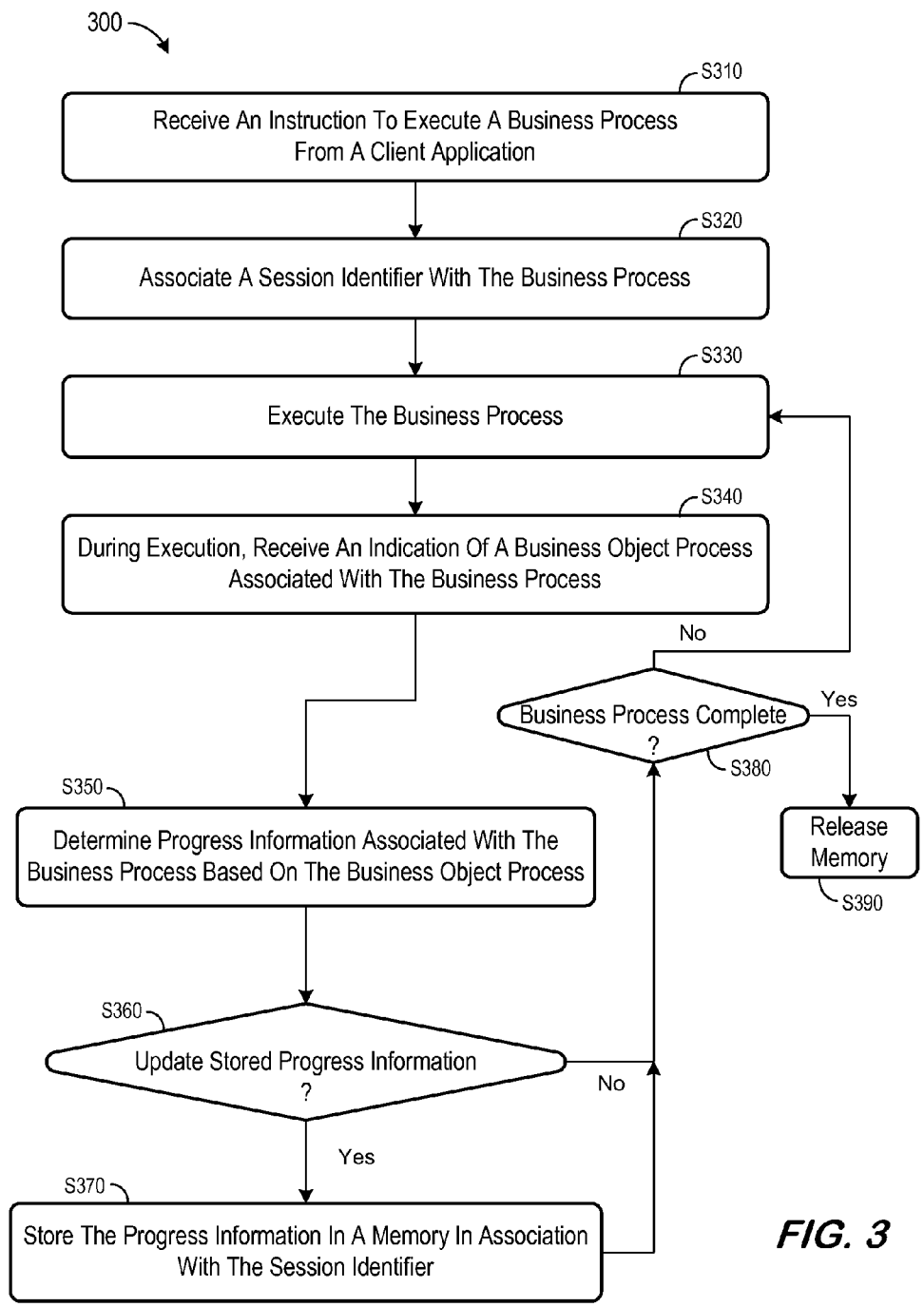
FIG. 3 is a flow diagram of a process according to some embodiments.

FIG. 3 is a flow diagram of process 300 to provide progress information according to some embodiments. Platform 210 may execute process 300 as will be described below, but embodiments are not limited thereto. All processes described herein may be executed by any combination of hardware and/or software. All processes described herein may also or alternatively be embodied in program code stored on a tangible medium and executable by a computer to provide the functions described.

Initially, an instruction to execute a business process is received from a client application at S310. The instruction may comprise a Web service call according to some embodiments. The instruction may be transmitted by the client application in response to user manipulation of a user interface presented by the client application.

FIG. 4 is an outward view of user interface 400 for describing an example of process 300 according to some embodiments. Client 220 may display user interface 400 on a hardware display to a user. It will be assumed that user interface 400 is intended to collect information used to create a record of a new employee and other associated records within business process platform 210.

Therefore, prior to S310, the user navigates to user interface 400 and completes the inputs fields thereof. The user then selects "Hire Employee" icon 410, causing client 220 to transmit an instruction to business process platform 210 (e.g., via HTTP) to execute the business process needed to effect the hiring of a new employee. This instruction is received by business process platform 210 at S310.

The instruction may include a session identifier (e.g., cookie), per the HTTP protocol. Business process platform 210 assigns the instruction to work process 230 and the session identifier is associated with the "hire employee" business process to be performed by work process 230.

Accordingly, work process 230 executes the business process at S330. Execution of the business process may include, but is not limited to, instantiating, populating and manipulating BOs 234 within business process platform 210. Each of BOs 234 may comprise a class defining data and methods associated with a business entity. For example, S330 may include creation of an employee business object, an employment business object, a work agreement business object, a compensation agreement business object, etc., as well as definition of dependencies therebetween.

At S340, and during execution of the business process, an indication of a business object process is received. The business object process is associated with the business process. In other words, the business object process is a process (or subprocess) executed by one of BOs 234 during execution of the business process.

According to some embodiments, CO 232 receives the indication at S340. The indication may be generated by one of BOs 234 and received directly therefrom or via a dedicated service as will be described below. One or more of BOs 234 may therefore be coded so as to generate one or more indications during processing.

Table 500 of FIG. 5 includes indications (e.g., Process_ID) that may be generated by one or more of BOs 234 during execution of a business object process. Each process ID beginning with (HCM_C_) is associated with a business object process that may be executed by a business object and known to the business object. Although only two process IDs beginning with HCM_C_ are shown, table 500 may include any number thereof.

After (or during) execution of a business object process, a business object may generate a corresponding process ID for reception by CO 232 at S340. Similarly, table 600 of FIG. 6 includes indications of business object subprocesses that might be generated by one or more of BOs 234 during execution of a business object subprocess. FIG. 6 illustrates only one business object process (i.e., HCM_C_01) and its corresponding subprocesses (i.e., 5 through 85), but embodiments are not limited thereto. An indication of a subprocess may include a process ID of a corresponding business object process (e.g., HCM_C_01) and a subprocess ID. A business object may generate a process ID and subprocess ID for reception by CO 234 at S340 after (or during) execution of a corresponding business object subprocess.

CO 232 may therefore access table 500 and/or table 600 at S340 to determine a business object process description and/or subprocess description which corresponds to the received process ID/subprocess ID. In some embodiments, table 500 and table 600 are stored in memory 250.

As mentioned above, a business object may be only aware of its own execution. A business object is most likely unaware of its role or its temporal position in the currently-executing business process. Accordingly, a business object is not suited to provide progress information regarding the overall business process being executed.

At S350, progress information associated with the business process is determined. The determination is based on the indication received at S340. According to the present example, CO 232 is coded to determined whether a mapping exists between the received indication and previously-stored business process progress information.

Tables 500 and 600 both show such previously-stored business process progress information according to some embodiments. The business process progress information is stored in conjunction with a process ID beginning with "HCM_A_" and, in the case of sub-processes (i.e., in table 600), also in conjunction with a subprocess ID.

The business processes and subprocesses (HCM_A_*, *) of tables 500 and 600 may correspond in any manner to the business object processes and subprocesses (HCM_C_*, *) of tables 500 and 600. For example, one business object process (e.g., HCM_C_01) may correspond to several business processes (e.g., HCM_A_01 through HCM_A_06). In some embodiments, several business object subprocesses (e.g., HCM_C_01, 5 through HCM_C_01, 85) may correspond to a smaller set of business subprocesses (e.g., HCM_A_01, 5 through HCM_A_06, 5).

CO 232 may therefore be coded to determine business object process/subprocess progress information (e.g., HCM_A_*, *) at S350 from tables 500 and/or 600 based on the received business object process ID/subprocess ID.

The determined progress information may include an indication of a degree of completion of the business process. This indication may comprise any information that indicates a degree of completion, examples of which include a percentage, a current step number and maximum step number, and a graphic. Again, this indication may be generated by CO 232 rather than by BOs 234 due to CO 232's knowledge of the overall business process.

Next, at S360, it is determined whether the determined progress information should be used to update already-stored progress information. It will be assumed that no other progress information is currently stored in memory 250 and therefore flow proceeds to S370.

The determined progress information is stored in a memory at S370 in association with the session identifier. According to some embodiments, software work process 230 stores the progress information in shared memory 250. Such storage enables retrieval of the progress information from shared memory 250 based on the session identifier.

Flow proceeds to S380 to determine whether the business process is complete. Process 300 therefore cycles through S330 to S380 as described above until it is determined that the business process is complete. After determining that the business process is complete, work process 230 may issue an instruction at S390 to release the area of shared memory 250 which is reserved for storing progress information.

As an example of S300 according to some embodiments, it will be assumed that a "hire employee" instruction was received at S310. During execution of this business process, the indications "HCM_C_01" and "25" were received at S340. Referring to table 600, these indications correspond to the business object process "Hiring an Employee" and its subprocess "Creating Identity and User".

At S350, CO 232 determines, based on the received indication, its own internal coding and table 600, the progress information "Hiring an Employee" and "Updating Identity". A corresponding indication is stored in shared memory 250 at S380. The indication may include the corresponding process ID (i.e., "HCM_A_03") and subprocess ID ("5"), and may be associated with a session identifier associated with the executing business process.

Continuing the present example, CO 232 may receive a second indication upon returning to S340. The second indication may include the indications "HCM_C_01" and "30". Again referring to tables 500 and 600, these indications correspond to the business object process "Hiring an Employee" and its subprocess "Assigning Employee to Organizational Structure".

At S350 of the present example, CO 232 determines that the progress information "Hiring an Employee" and "Updating Identity" corresponds to the second indication. Since this progress information is identical to the previously-stored business process progress information, the progress information is not updated and flow proceeds to S380 and continues as described above.

It is assumed that the indication "HCM_C_01", "45" is then received at S340. At S350, CO 232 determines the progress information "Hiring an Employee" and "Updating Compensation Agreement" as corresponding to the received indication. Since this progress information differs from the most-recently stored progress information, an indication of this progress information (i.e., "HCM_A_05", "5") is stored in shared memory 250 at S370 in association with the session identifier. It may be preferable to overwrite previously-stored progress information to avoid confusion as to which is most recent.

Figure 7:
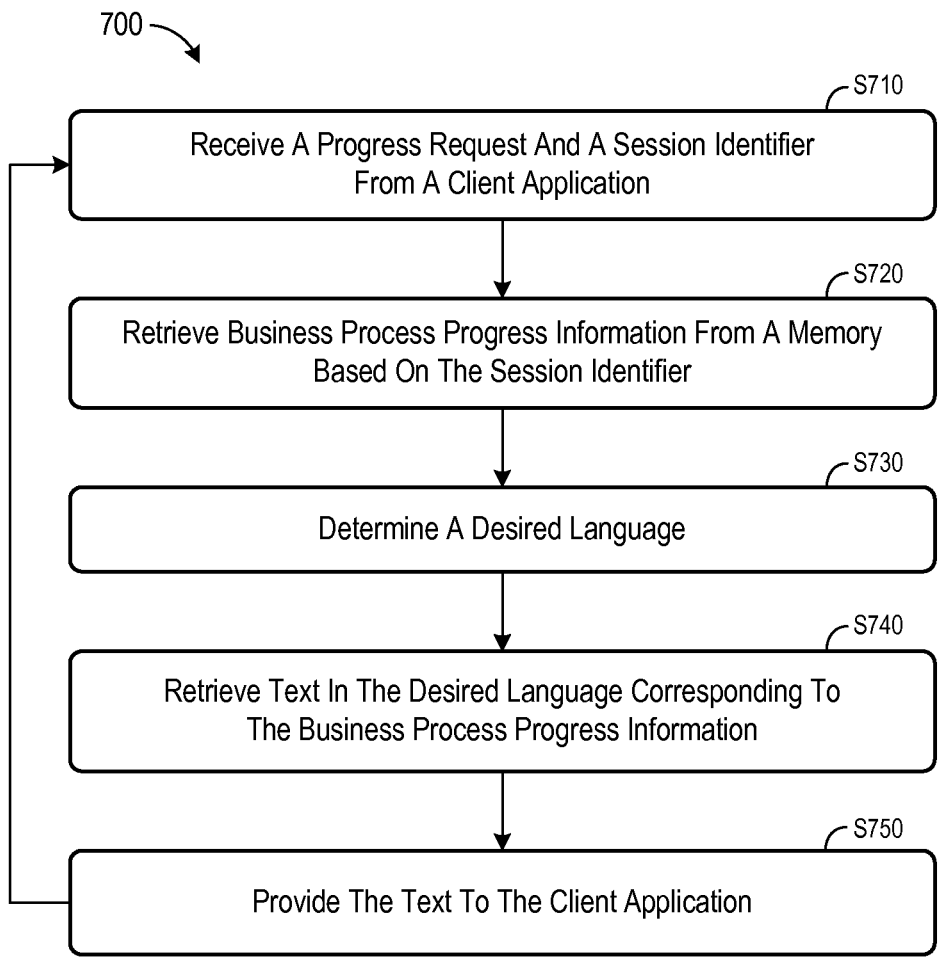
FIG. 7 is a view of a user interface according to some embodiments.

FIG. 7 is a flow diagram of process 700 to provide progress information according to some embodiments. Platform 210 may also execute process 700 as will be described below, but embodiments are not limited thereto.

Process 700 may be performed in parallel with process 300 of FIG. 3. Generally, as progress information is stored and updated in a shared memory according to process 300, the progress information may be retrieved therefrom and provided to a client application according to process 700. In some embodiments, the progress information is stored and updated by a first software work process (e.g., work process 230) and is retrieved and provided to the client application by a second software work process (e.g., work process 240).

Initially, at S710, a progress request and a session identifier are received from a client application. For example, client 220 may send a progress request and the session identifier to business process platform 210 from the same client session used to send the instruction received at S310. Client 220 may send the progress request at a pre-designated interval (e.g., 1 second) after sending the instruction.

Business process platform 210 assigns the progress request to work process 240 and, at S720, work process 240 retrieves the progress information from shared memory 250. Work process 240 may use the received session identifier as a key to retrieve the progress information from shared memory 250 at S720. The retrieved progress information may include IDs such as those shown in tables 500 and 600 and/or associated text descriptions. As described above, the retrieved progress information may include an indication of a degree of completion of the business process.

A desired language is then determined at S730. The desired language may be a current system language (i.e., "LANGU") specified by configuration tables of platform 210. In some embodiments, the desired language is specified within the received progress request.

Next, at S740, text in the desired language is retrieved. The text corresponds to the retrieved business process progress information. According to some embodiments, work process 240 requests text from text tables 260 using IDs (e.g., "HCM_A_03", "5") associated with the business process progress information and an indication of the desired language.

Retrieving the text in response to progress requests may consume fewer resources than systems in which work process 230 stores the progress information in memory 250 in the desired language. Such systems must retrieve text in the desired language each time progress information is stored.

The text is provided to the client application at S750. Such provision may proceed according to the standard HTTP request/response protocol. More specifically, the text is sent via an HTTP response corresponding to the HTTP progress request received at S710. An indication of a degree of completion of the business process may also be sent to the client application at S750.

Figure 8:
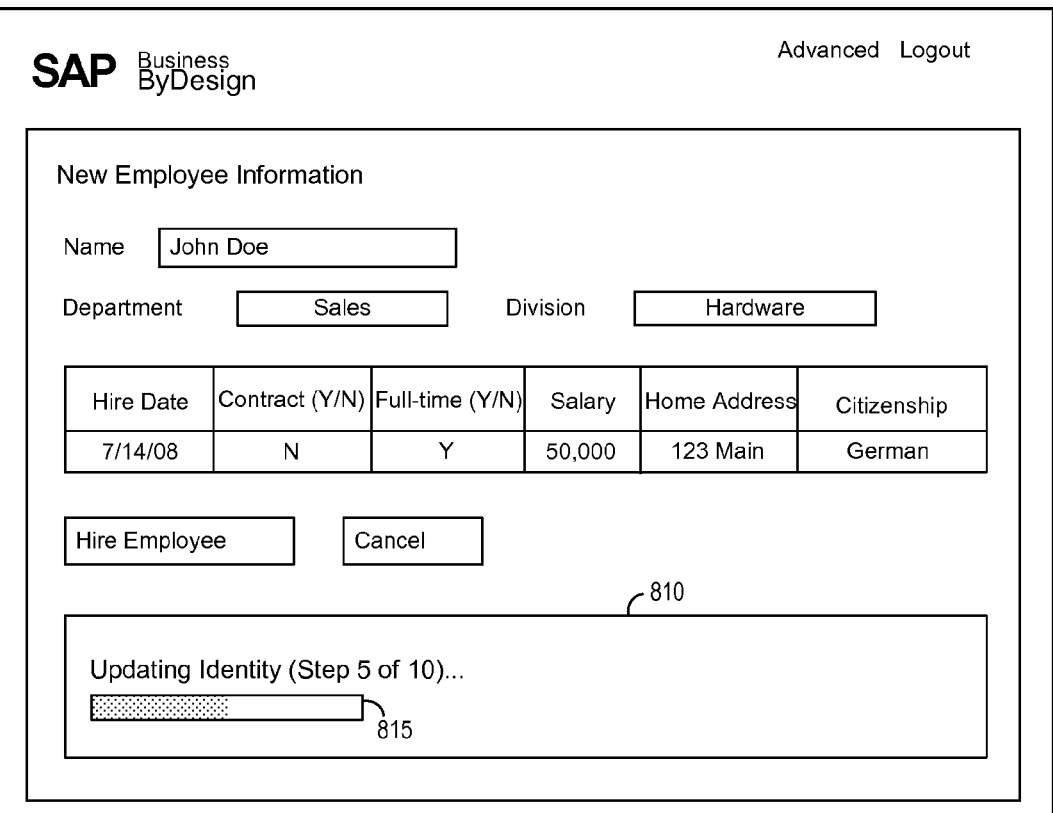
FIG. 8 is a view of a user interface presenting progress information according to some embodiments.

FIG. 8 is a view of user interface 800 displayed by client 220 after S750 according to some embodiments. User interface 800 is identical to user interface 400 of FIG. 4 except for the appearance of progress information window 810. Window 810 includes the text "Updating Identity" and the indication "(Step 5 of 10)" which may have been provided to client 220 at S750 of process 700. Window 810 also includes progress bar 815 to illustrate the degree of completion of the business process. The provided progress information may be presented by the client application in any suitable manner.

Flow returns from S750 to S710 to await another progress request. If another request and session identifier are received, progress information is retrieved from shared memory 250 at S720 as described above. Due to concurrent execution of process 300, the now-retrieved progress information may be different from the progress information retrieved in response to the last progress request.

Figure 9:
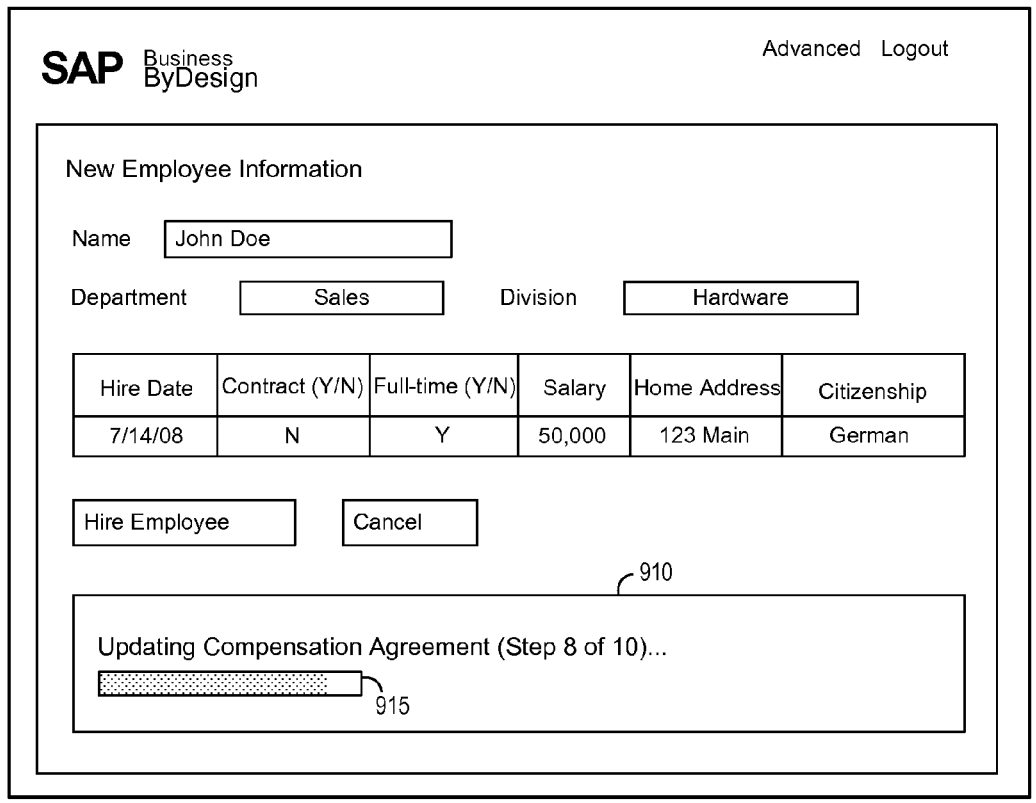
FIG. 9 is a view of a user interface presenting progress information according to some embodiments.

Flow therefore continues through process 700 as described above until text in the desired language and corresponding to the progress information is provided to the client application at S750. Continuing with the present example, FIG. 9 is a view of user interface 900 displayed by client 220 after S750 according to some embodiments. User interface 900 includes progress information window 910, the contents of which have changed since the time represented in FIG. 8.

Specifically, window 910 includes the text "Updating Compensation Agreement" and the indication "(Step 8 of 10)", and progress bar 915 is more advanced than shown in FIG. 9. User interface 900 thereby provides a visual indication of advancing progress according to some embodiments. Again, any other information indicative of execution progress may be provided at S750, and that information may be presented by the client application in any suitable manner.

Figure 10:
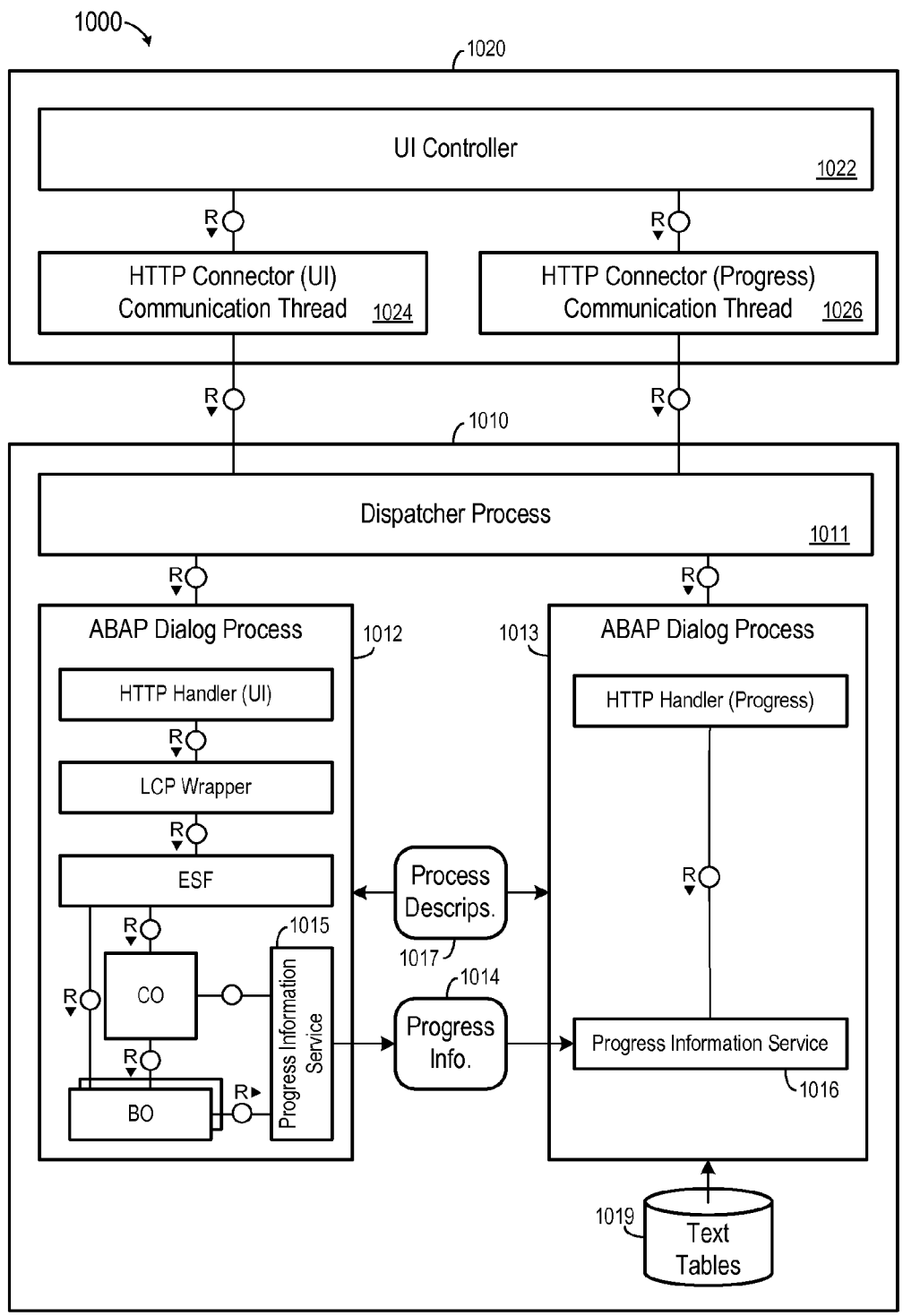
FIG. 10 is a detailed block diagram of a system according to some embodiments.

FIG. 10 is a detailed block diagram of system 1000 according to some embodiments. System 1000 includes business process platform 1010 and client 1020. System 1000 may therefore comprise a specific implementation of system 200, and business process platform 1010 and client 1020 may execute the functions attributed above to business process platform 210 and client 220, respectively.

Business process platform 1010 may comprise a service-oriented architecture to provide services to client 1020 and to other clients according to some embodiments. Business process platform 1010 includes dispatcher process 1011 to receive HTTP requests from client 1020 and to forward the requests to appropriate work processes. For example, dispatcher process 1011 may receive an HTTP request associated with user interface floorplan functionality and may dispatch the request to ABAP dialog process 1012. Based on the type of request, ABAP dialog process 1012 calls an HTTP Handler (UI).

Local Client Proxy (LCP) Wrapper of ABAP dialog process 1012 forwards the request to an Enterprise Services Framework (ESF). As is known in the art, the ESF manipulates BOs to provide enterprise services. The ESF may also issue requests to an CO associated with the currently-viewed UI floorplan. As described above, the CO provides additional business knowledge and functionality behind the operation of the UI floorplan.

HTTP Handler (Progress) uses progress information service 1016 to retrieve the progress information from shared memory 1014 and returns the progress information to client 1020.

Memory 1017 may include tables 500 and 600. Memory 1017 may be accessible by both of processes 1012 and 1013. Processes 1012 and 1013 may therefore provide, receive and process information related to business processes, business subprocesses, business object processes and business object subprocesses via their respective IDs.

Client 1020 may comprise a Web client as described above. UI controller 1022 of client 1020 may comprise a software thread to control a user interface displayed by client 1020. Requests related to user interface functionality are passed from UI controller 1022 to HTTP connector UI communication thread 1024 and on to platform 1010. Similarly, UI controller 1022 passes requests for progress information to HTTP connector progress communication thread 1026.

System 1000 may execute processes 300 and 700 according to some embodiments. In a specific example, an instruction to execute a business process associated with a UI floorplan is passed from UI controller 1022 to HTTP connector UI communication thread 1024, to dispatcher process 1011, and is received by dialog process 1012 at S310.

The CO may then call an interface of progress information service 1015 to register therewith. Registration informs progress information service 1015 to provide the CO with any progress-related information received from the BOs during execution of the business process. The following interface may be used:

```
CL_CONTROLLER_PROGRESS_INFO=>SET_CONTROLLER_OBJECT
    EXPORTING CONTROLLER_OBJECT    TYPE  REF TO IF_CONTROLLER_PROGRESS_INFO
```

Progress information service 1015, as will be described in detail below, receives information generated by one or more BOs of dialog process 1012 and provides the information to the CO. Progress information service 1015 may also receive progress information from the CO and store the progress information in shared memory. Progress information service 1015 may provide an application programming interface of static class methods to facilitate this operation according to some embodiments.

Upon receiving a request for progress information, dispatcher process 1011 may dispatch the request to ABAP dialog process 1013. In turn, ABAP dialog process 1013 calls an HTTP Handler (Progress). As will be described below, the Next, the ESF, BOs and CO of process 1012 operate to execute the business process at S330. During such execution, one or more BOs may generate progress-related information and provide this information to progress information service 1013 via an interface such as:

```
CL_PROVIDER_PROGRESS_INFO=>SET_PROGRESS_INFO
    EXPORTING   BUSINESS_PROCESS        TYPE  APBP_BUS_PROCESS
                BUSINESS_SUB_PROCESS    TYPE  APBP_BUS_PROCESS,
``` where BUSINESS_PROCESS identifies a business object process such as those shown in table 500 and BUSINESS_SUB_PROCESS identifies a business object subprocess such as those shown in table 600.

Due to registration of the CO, progress information service 1015 performs a callback to the CO upon receipt of the information from the one or more BOs. The callback may be implemented as follows:

```
IF_CONTROLLER_PROGRESS_INFO=>ON_SET_PROGRESS_INFO
    IMPORTING   BUSINESS_PROCESS        TYPE  APBP_BUS_PROCESS
                BUSINESS_SUB_PROCESS    TYPE  APBP_BUS_PROCESS
```

After proceeding through S350 and S370 as described above to determine progress information based on the indicated business object process, the CO calls another interface of progress information service 1015 to store the progress information in shared memory 1014. The foregoing is an example of such an interface according to some embodiments:

```
CL_CONTROLLER_PROGRESS_INFO=>SET_PROGRESS_INFO
    EXPORTING   BUSINESS_PROCESS        TYPE    APBP_BUS_PROCESS
                BUSINESS_SUB_PROCESS    TYPE    APBP_BUS_PROCESS
                CURRENT_STEP            TYPE    OPTIONAL
                MAXIMUM_STEP            TYPE    OPTIONAL
                MSG_VARIABLE1           TYPE    PIS_PARAMETER_VALUE
                ...
                SUB_MSG_VARIABLE1       TYPE    PIS_PARAMETER_VALUE,
``` where CURRENT_STEP describes a current position within the executing business process and MAXIMUM_STEP describes a maximum position within the executing business process. BUSINESS_PROCESS and BUSINESS_SUB_PROCESS may be represented using IDs as described above. If the progress information text includes variables which cannot be statically determined in the absence of runtime context, the caller of the method may use variables to provide dynamic progress information.

For example, progress information may comprise "Updating &1 Purchase Orders". In this example, the value of variable &1 cannot be determined at design time of the progress information. Instead, the value is dynamically provided at runtime.

Turning to process 700, the request to retrieve progress information received at S710 is formatted as follows according to some embodiments:

```
<REQUEST>
    <COMMAND>PIQ</COMMAND>
    <SESSION_ID>id_of_session</SESSION_ID>
    <LANGUAGE>language</LANGUAGE>
</REQUEST>
```

After receiving the request, the HTTP Handler (Progress) of process 1013 may call interfaces of progress information service 1016 in order to retrieve the progress information. First, HTTP Handler (Progress) calls:

```
CL_SHARED_FB_UI_SERVICES=>SET_SESSION_ID
    IMPORTING SESSION_ID      TYPE    STRING,
``` to set the session ID. Next, HTTP Handler (Progress) calls:

```
CL_SHARED_FB_UI_SERVICES =>GET_PROGRESS_INFO
    IMPORTING   LANGUAGE                    TYPE    LANGU
    EXPORTING   BUSINESS_PROCESS            TYPE    APBP_BUS_PROCESS
                BUSINESS_PROCESS_TEXT       TYPE    STRING
                BUSINESS_SUB_PROCESS        TYPE    APBP_BUS_PROCESS
                BUSINESS_SUB_PROCESS_TEXT   TYPE    STRING
                CURRENT_STEP                TYPE    OPTIONAL
                MAXIMUM_STEP                TYPE    OPTIONAL,
```

In response, progress information service 1016 reads the progress information (i.e., PROGRESS_PERCENTAGE and PROGRESS_TEXT) from shared memory 1014 at S720 using SESSION_ID as a key. The returned BUSINESS_PROCESS_TEXT and BUSINESS_SUB_PROCESS_TEXT comprise language-dependent text retrieved from text tables 1019 based on the specified LANGUAGE and BUSINESS_PROCESS/BUSINESS_SUB_PROCESS. In case no language was specified in the progress request, LANGUAGE may be populated with the language of the login user of client 1020.

At S750, the following HTTP-compatible format may be used to provide the progress information to client application 1020:

```
<RESPONSE>
    <LANGUAGE>language</LANGUAGE>
    <PROCESS>process</PROCESS>
    <PROCESS_TEXT>process_text</PROCESS_TEXT>
    <SUB_PROCESS>sub_process</SUB_PROCESS>
    <SUB_PROCESS_TEXT>sub_process_text
    </SUB_PROCESS_TEXT>
    <CURRENT_STEP>current_step</CURRENT_STEP>
    <MAXIMUM_STEP>maximal_step</MAXIMUM_STEP>
</RESPONSE>
```

Once the CO determines that the business process is completed at S380, the CO may call the following interface at S390 to reset shared memory 1014: CL_CONTROLLER_PROGRESS_INFO=>RESET_PROGRESS_INFO Some embodiments of the foregoing may therefore efficiently provide progress information to a client application in a service-oriented architecture. Some embodiments may be enabled or disabled at the system, server and/or application level to provide flexibility and optimization.

Some embodiments may facilitate testing of business objects. In this regard, a test platform may register with progress information service 1015 to receive indications of business object processes and business object sub-processes which are generated by executing BOs. The test platform may then use corresponding descriptions stored in memory 1018 to monitor the execution of the business objects.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method comprising:
   receiving an instruction at a first software work process to execute a business process from a client application;
   executing the business process in the first software work process;
   during execution of the business process, receiving an indication of a first business object process associated with the business process;
   determining first progress information associated with the business process based on the indication of the first business object process;
   storing the first progress information within a shared memory;
   during execution of the business process, receiving an indication of a second business object process associated with the business process;
   determining second progress information associated with the business process based on the indication of the second business object process;
   determining if the first progress information differs from the second progress information;
   if a difference exists, overwriting the shared memory with the second progress information;
   receiving, at a second software work process, a request from the client application for progress information;
   retrieving, in the second software work process, the progress information from the shared memory; and
   providing the progress information to the client application from the second software work process.

2. The method according to claim 1, wherein providing the progress information to the client application from the second software work process comprises:
   determining a desired language;
   retrieving, in the second software work process, text in the desired language and corresponding to the progress information; and
   providing the text to the client application from the second software work process.

3. The method according to claim 2, wherein storing the progress information within the memory comprises storing a session identifier associated with the business process in association with the progress information in the memory,
   wherein the request from the client application comprises the session identifier and an indication of the desired language, and
   wherein retrieving the progress information from the shared memory comprises retrieving, in the second software work process, the progress information from the memory based on the session identifier.

4. The method according to claim 1, further comprising:
   receiving, at the second software work process, a second request from the client application for progress information;
   retrieving, in the second software work process, the second progress information from the shared memory based on the session identifier; and
   providing the second progress information to the client application from the second software work process.

5. The method according to claim 1, further comprising determining to not store the second progress information associated with the second business process within the shared memory based on the indication of the second business object process.

6. The method according to claim 1, wherein the first and the second progress information comprises an indication of a degree of completion of the business process.

7. A non-transitory computer-readable medium storing program instructions executable by a computer to:
   receive an instruction at a first software work process to execute a business process from a client application;
   execute the business process in the first software work process;
   during execution of the business process, receive an indication of a first business object process associated with the business process;
   determine first progress information associated with the business process based on the indication of the first business object process;
   store the progress information within a shared memory;
   during execution of the business process, receive an indication of a second business object process associated with the business process;
   determine second progress information associated with the business process based on the indication of the second business object process;
   determine if the first progress information differs from the second progress information;
   if a difference exists, overwrite the shared memory with the second progress information;
   receive, at a second software work process, a request from the client application for progress information;
   retrieve, in the second software work process, the progress information from the shared memory; and
   provide the progress information to the client application from the second software work process.

8. The medium according to claim 7, wherein the program instruction executable to provide the progress information to the client application from the second software work process comprises instructions executable to:
   determine a desired language;
   retrieve, in the second software work process, text in the desired language and corresponding to the progress information; and
   provide the text to the client application from the second software work process.

9. The medium according to claim 8, wherein the program instruction executable to store the progress information within the memory comprises instructions executable to store a session identifier associated with the business process in association with the progress information in the memory,
   wherein the request from the client application comprises the session identifier and an indication of the desired language, and wherein the code executable to retrieve the progress information from the shared memory comprises the code executable to retrieve, in the second software work process, the progress information from the memory based on the session identifier.

10. The medium according to claim 7, the instructions further executable to:
   receive, at the second software work process, a second request from the client application for progress information;
   retrieve, in the second software work process, the second progress information from the shared memory based on the session identifier; and
   provide the second progress information to the client application from the second software work process.

11. The medium according to claim 7, the instructions further executable to determine to not store the second progress information associated with the second business process within the shared memory based on the indication of the second business object process.

12. The medium according to claim 7, wherein the first and the second progress information comprises an indication of a degree of completion of the business process.

13. A system comprising:
   a client application to present a user interface and to receive, via the user interface, a first instruction to execute a business process; and
   a business process platform comprising:
   a shared memory;
   a first software work process in communication with the shared memory, the first software work process configured to receive the first instruction, to execute the business process in a first software work process, to receive, during execution of the business process, an indication of a first business object process associated with the business process, to determine first progress information associated with the business process based on the indication of the first business object process, and to store the first progress information within a shared memory;
   the first software work process further configured to, during execution of the business process, receive an indication of a second business object process associated with the business process, determine second progress information associated with the business process based on the indication of the second business object process, determine if the first progress information differs from the second progress information, and if a difference exists, overwrite the shared memory with the second progress information; and
   the business process platform further including a second work process to receive a request from the client application for progress information, to retrieve the progress information from the shared memory and to provide the progress information to the client application.

14. The system according to claim 13, the second software work process further to determine a desired language, retrieve text in the desired language and corresponding to the progress information, and provide the text to the client application from the second software work process.

15. The system according to claim 14, wherein storage of the progress information within the memory comprises storage of a session identifier associated with the business process in association with the progress information in the memory,
   wherein the request from the client application comprises the session identifier and an indication of the desired language, and
   wherein retrieval of the progress information from the shared memory comprises retrieval of the progress information from the memory based on the session identifier.

16. The system according to claim 13, the second software work process further configured to:
   receive a second request from the client application for progress information;
   retrieve the second progress information from the shared memory based on the session identifier; and
   provide the second progress information to the client application from the second software work process.

17. The system according to claim 13, the first work process further configured to determine to not store second progress information associated with the second business process within the shared memory based on the indication of the second business object process.

18. The system according to claim 13, wherein the first and the second progress information comprises an indication of a degree of completion of the business process.

\* \* \* \* \*